US012756889B2

(12) United States Patent
Zhang et al.

(10) Patent No.: US 12,756,889 B2
(45) Date of Patent: Oct. 6, 2026

(54) PAGE DISPLAY METHOD AND APPARATUS, AND STORAGE MEDIUM

(71) Applicant: Beijing Youzhuju Network Technology Co., Ltd., Beijing (CN)

(72) Inventors: Minglei Zhang, Beijing (CN); Wenming Geng, Beijing (CN); Pan Chen, Beijing (CN); Xiubin Wang, Beijing (CN); Yu Mou, Beijing (CN); Zilong Yang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/818,981

(22) Filed: Aug. 29, 2024

(65) Prior Publication Data

US 2025/0080792 A1 Mar. 6, 2025

(30) Foreign Application Priority Data

Aug. 30, 2023 (CN) .......................... 202311110368.9

(51) Int. Cl.
*H04N 21/431* (2011.01)
*H04N 21/2187* (2011.01)
*H04N 21/478* (2011.01)

(52) U.S. Cl.
CPC ..... *H04N 21/4312* (2013.01); *H04N 21/2187* (2013.01); *H04N 21/47815* (2013.01)

(58) Field of Classification Search
CPC ........... H04N 21/4312; H04N 21/2187; H04N 21/47815; H04N 21/4316; H04N 21/47205
See application file for complete search history.

(56) References Cited

U.S. PATENT DOCUMENTS

| | | | | |
|---|---|---|---|---|
| 9,160,960 | B2 * | 10/2015 | Schwesinger .... | H04N 21/44016 |
| 2002/0026637 | A1 * | 2/2002 | Markel ............. | H04N 21/6377 348/E7.071 |

(Continued)

FOREIGN PATENT DOCUMENTS

| | | | |
|---|---|---|---|
| CN | 115545818 | A | 12/2022 |
| CN | 115907889 | A | 4/2023 |
| JP | 2020046785 | A | 3/2020 |

OTHER PUBLICATIONS

English Translation CN115545 (Year: 2022).*

(Continued)

*Primary Examiner* — Fernando Alcon
(74) *Attorney, Agent, or Firm* — Alleman Hall LLP

(57) ABSTRACT

Embodiments of the present application provide a page display method and apparatus, and a storage medium. The method includes: loading an object presentation module in response to a trigger operation for a target control in a live streaming page, wherein the object presentation module at least includes object information; in response to determining that the object presentation module is successfully loaded, displaying the object presentation module, and loading an object aggregation module, wherein the object aggregation module at least includes an object aggregation identifier; in response to determining that the object aggregation module is successfully loaded and a first operation for a display page of the object presentation module is detected, fusing the object presentation module and the object aggregation module to obtain a fused module, wherein the fused module at least includes the object information and the object aggregation identifier; and displaying the fused module.

20 Claims, 10 Drawing Sheets

(56) References Cited

U.S. PATENT DOCUMENTS

| | | | | |
|---|---|---|---|---|
| 2002/0047928 | A1* | 4/2002 | De Meersman | H04N 5/45 348/E9.037 |
| 2002/0067433 | A1* | 6/2002 | Yui | H04N 21/4622 348/E5.103 |
| 2005/0012759 | A1* | 1/2005 | Valmiki | H04N 7/00 348/E7.012 |
| 2007/0030276 | A1* | 2/2007 | MacInnis | H04N 9/75 345/505 |
| 2011/0078305 | A1* | 3/2011 | Varela | H04N 21/4316 709/224 |
| 2013/0297604 | A1 | 11/2013 | Sutedja et al. | |
| 2016/0114245 | A1* | 4/2016 | Tagawa | A63F 13/58 463/31 |
| 2017/0264936 | A1* | 9/2017 | Depies | G02B 27/0093 |
| 2017/0272811 | A1* | 9/2017 | Zan | H04N 21/8455 |
| 2018/0247550 | A1* | 8/2018 | Lu | H04N 21/2143 |
| 2019/0007520 | A1* | 1/2019 | Lin | H04L 67/51 |
| 2022/0272406 | A1* | 8/2022 | Wang | H04N 21/4394 |
| 2023/0032115 | A1* | 2/2023 | Dewitt | G11B 27/34 |
| 2023/0421857 | A1* | 12/2023 | Zhang | H04N 21/47815 |
| 2024/0031655 | A1* | 1/2024 | Xu | H04N 21/4316 |
| 2024/0040201 | A1* | 2/2024 | Lee | G06F 16/74 |
| 2024/0348863 | A1* | 10/2024 | Zhang | G06F 9/451 |

OTHER PUBLICATIONS

ISA China National Intellectual Property Administration, International Search Report and Written Opinion Issued in Application No. PCT/CN2024/114988, Dec. 3, 2024, 14 Pages.

* cited by examiner

PAGE DISPLAY METHOD AND APPARATUS, AND STORAGE MEDIUM

CROSS-REFERENCE TO RELATED APPLICATION(S)

This application claims priority to Chinese Application No. 202311110368.9 filed in Aug. 30, 2023, the disclosure of which is incorporated herein by reference in its entirety.

FIELD

The present application relates to the technical field of the Internet, and in particular to a page display method and apparatus, and a storage medium.

BACKGROUND

During a live streaming process, if a user is interested in a certain commodity in the current live streaming, the user may click on a shopping cart to check commodity information corresponding to the present live streaming, and find and purchase the commodity. If the user also wants to know other commodities in a store where the commodity is located, the user may enter a store page by clicking on a store name above the commodity information, so as to browse the commodities in the store.

However, when the user switches from a commodity information page to the store page in this manner, there is a page skip process, which takes a certain time of the user, such that the user experience is worse.

SUMMARY

In view of this, embodiments of the present application provides a page display method and apparatus, and a storage medium, so as to reduce an interaction cost of a user in a live streaming process.

To achieve the foregoing objective, the embodiments of the present application provide the following technical solutions:

In a first aspect, an embodiment of the present application provides a page display method, including: loading an object presentation module in response to a trigger operation for a target control in a live streaming page, wherein the object presentation module at least includes object information; when it is determined that the object presentation module is successfully loaded, displaying the object presentation module, and loading an object aggregation module, wherein the object aggregation module at least includes an object aggregation identifier; when it is determined that the object aggregation module is successfully loaded and a first operation for a display page of the object presentation module is detected, fusing the object presentation module and the object aggregation module to obtain a fused module, wherein the fused module at least includes the object information and the object aggregation identifier; and displaying the fused module.

As an optional implementation of the embodiment of the present application, fusing the object presentation module and the object aggregation module to obtain the fused module includes: when a current operating system is a first-type operating system, calling a fusion method by a fusion page, using the object aggregation module as a parent layout, and using the object presentation module as a child layout of the parent layout to obtain the fused module; or, when the current operating system is a second-type operating system, calling a fusion component by the fusion page, and fusing the object presentation module into the object aggregation module to obtain the fused module.

As an optional implementation of the embodiment of the present application, after displaying the fused module, the method further includes: upon detecting a second operation for a display page of the fused module, performing de-fusion processing on the fused module to obtain the object presentation module and the object aggregation module, and hiding the object aggregation module.

As an optional implementation of the embodiment of the present application, performing de-fusion processing on the fused module to obtain the object presentation module and the object aggregation module includes: when the current operating system is the first-type operating system, calling a de-fusion approach by a de-fusion page, and separating the object presentation module as the child layout from the object aggregation module as the parent layout, so as to obtain the object presentation module and the object aggregation module; or when the current operating system is the second-type operating system, calling a de-fusion component by the de-fusion page, and performing de-fusion processing on the fused module to obtain the object presentation module and the object aggregation module.

As an optional implementation of the embodiment of the present application, when the current operating system is the second-type operating system, the method further includes: obtaining a fusing progress of fusing the object presentation module into the object aggregation module, and when the fusing progress is greater than a fusion threshold value, determining that the fusion succeeds and obtaining the fused module; and obtaining a de-fusing progress of performing de-fusion processing on the fused module, and when the de-fusing progress is greater than a de-fusion threshold value, determining that the de-fusion succeeds and obtaining the object presentation module and the object aggregation module.

As an optional implementation of the embodiment of the present application, detecting the first operation for the display page of the object presentation module includes: when the current operating system is the first-type operating system, detecting, by the object aggregation module, the first operation for the display page of the object presentation module; or, when the current operating system is the second-type operating system, detecting, by a preset proxy, the first operation for the display page of the object presentation module.

As an optional implementation of the embodiment of the present application, displaying the object presentation module includes: displaying the object presentation module at a first ratio, wherein the first ratio is a ratio of a display view of the object presentation module to a display interface of a screen.

As an optional implementation of the embodiment of the present application, displaying the fused module includes: displaying the fused module at a second ratio, wherein the second ratio is a ratio of a display view of the fused module to the display interface of the screen.

In a second aspect, an embodiment of the present application provides a page display apparatus, including: a processing unit, configured to load an object presentation module in response to a trigger operation for a target control in a live streaming page, wherein the object presentation module at least includes object information; a display unit, configured to: when it is determined that the object presentation module is successfully loaded, display the object presentation module, and load an object aggregation module, wherein the object aggregation module at least includes an object aggregation identifier; and a fusion unit, configured to: when it is determined that the object aggregation module is successfully loaded and a first operation for a display page of the object presentation module is detected, fuse the object presentation module and the object aggregation module to obtain a fused module, wherein the fused module at least includes the object information and the object aggregation identifier, wherein the display unit is further configured to display the fused module.

As an optional implementation of the embodiment of the present application, the fusion unit is specifically configured to: when a current operating system is a first-type operating system, call a fusion method by a fusion page, use the object aggregation module as a parent layout, and use the object presentation module as a child layout of the parent layout to obtain the fused module; or, when the current operating system is a second-type operating system, call a fusion component by the fusion page, and fuse the object presentation module into the object aggregation module to obtain the fused module.

As an optional implementation of the embodiment of the present application, the fusion unit is further configured to: upon detecting a second operation for a display page of the fused module, perform de-fusion processing on the fused module to obtain the object presentation module and the object aggregation module, and hide the object aggregation module.

As an optional implementation of the embodiment of the present application, the fusion unit is specifically configured to: when the current operating system is the first-type operating system, call a de-fusion approach by a de-fusion page, and separate the object presentation module as the child layout from the object aggregation module as the parent layout, so as to obtain the object presentation module and the object aggregation module; or, when the current operating system is the second-type operating system, call a de-fusion component by the de-fusion page, and perform de-fusion processing on the fused module to obtain the object presentation module and the object aggregation module.

As an optional implementation of the embodiment of the present application, when the current operating system is the second-type operating system, the fusion unit is further configured to: acquire a fusing progress of fusing the object presentation module into the object aggregation module, and when the fusing progress is greater than a fusion threshold value, determine that the fusion succeeds and obtain the fused module; and acquire a de-fusing progress of performing de-fusion processing on the fused module, and when the de-fusing progress is greater than a de-fusion threshold value, determine that the de-fusion succeeds and obtain the object presentation module and an object aggregation module.

As an optional implementation of the embodiment of the present application, the fusion unit is specifically configured to: when the current operating system is the first-type operating system, detect, by the object aggregation module, the first operation for the display page of the object presentation module; or, when the current operating system is the second-type operating system, detect, by a preset proxy, the first operation for the display page of the object presentation module.

As an optional implementation of the embodiment of the present application, the display unit is specifically configured to display the object presentation module at a first ratio, wherein the first ratio is a ratio of a display view of the object presentation module to a display interface of a screen.

As an optional implementation of the embodiment of the present application, the display unit is specifically configured to display the fused module at a second ratio, wherein the second ratio is a ratio of a display view of the fused module to the display interface of the screen.

In a third aspect, an embodiment of the present application provides an electronic device, including a memory and a processor, wherein the memory is configured to store a computer program; and the processor is configured to, when executing the computer program, cause the electronic device to implement the page display method in any one of the above implementations.

In a fourth aspect, an embodiment of the present application provides a computer-readable storage medium, wherein when a computer program is executed by a computing device, the computing device is caused to implement the page display method in any one of the above implementations.

In a fifth aspect, an embodiment of the present application provides a computer program product that, when running on a computer, causes the computer to implement the page display method in any one of the above implementations.

In the page display method provided in the embodiment of the present application, the object presentation module is loaded in response to the trigger operation for the target control in the live streaming page. Then, when it is determined that the object presentation module is successfully loaded, the object presentation module is displayed, and the object aggregation module is loaded. Afterwards, when it is determined that the object aggregation module is successfully loaded and the first operation for the display page of the object presentation module is detected, the object presentation module and the object aggregation module are fused to obtain the fused module, and the fused module is displayed. In this way, firstly, when it is determined that the object presentation module is successfully loaded, the object aggregation module is directly loaded, thereby avoiding loading only when the user requires, saving the time of the user and improving the user experience. Secondly, when the user performs the first operation, the object presentation module and the object aggregation module are directly fused and displayed, page skip is not needed any more, thereby saving on the interaction cost of the user and further improving the user experience. In addition, the object presentation module and the object aggregation module are separately loaded and fused when necessary, so that when the content of the object presentation module or the content of the object aggregation module is modified and deleted, the other module is not affected, thereby reducing mutual interference during inter-service iteration.

BRIEF DESCRIPTION OF THE DRAWINGS

The drawings herein are incorporated in and constitute a part of the specification, illustrate embodiments conforming to the present application, and are intended to explain the principles of the present application together with the specification.

To illustrate technical solutions in the embodiments of the present application or in the prior art more clearly, a brief introduction on the drawings which are needed in the description of the embodiments or the prior art is given below. Apparently, for those ordinary skilled in the art, other drawings may also be obtained according to these drawings without any creative effort.

DETAILED DESCRIPTION OF EMBODIMENTS

In order to understand the above objectives, features and advantages of the present application more clearly, the solutions of the present application will be further described below. It should be noted that, in the case of no conflict, embodiments of the present application and features in the embodiments may be combined with each other.

In the following description, numerous specific details are set forth to fully understand the present application, but the present application may also be implemented in other manners different from those described herein; and obviously, the embodiments in the specification are only a part, but not all, of the embodiments of the present application.

In the embodiments of the present application, words such as "exemplary" or "for example" are used for representing as an example, an illustration, or a description. Any embodiment or design solution described as "exemplary" or "for example" in the embodiments of the present application should not be explained as being more preferred or having more advantages than other embodiments or design solutions. Exactly, the words such as "exemplary" or "for example" are called to present related concepts in a specific manner. In addition, in the description of the embodiments of the present application, unless otherwise specified, "a plurality of" means two or more.

A scenario architecture of a page display method provided in an embodiment of the present application will be described first below.

Figure 1:
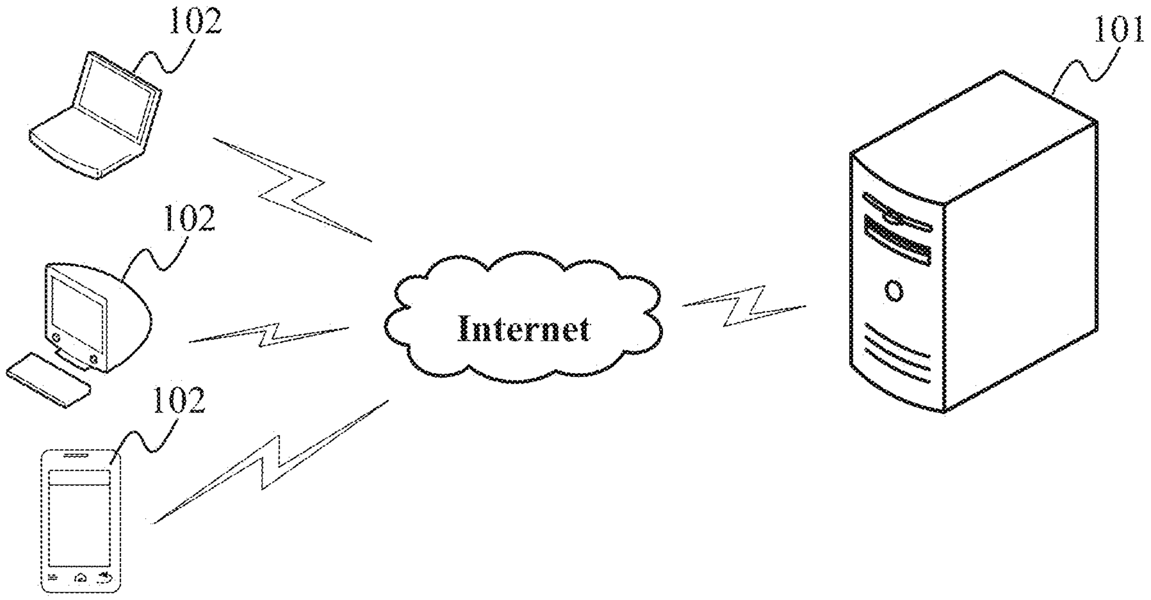
FIG. 1 is a diagram illustrating a scenario architecture of a page display method provided in an embodiment of the present application.

Referring to FIG. 1, in some embodiments, the scenario architecture of the page display method provided in the embodiment of the present application includes an electronic device 102 and a server 101, wherein the electronic device 102 and the server 101 may be connected and communicate with each other by a local area network (LAN) or a wireless local area network (WLAN). The electronic device 102 may include a first electronic device and at least one second electronic device, it should be noted that, FIG. 1 is merely an example, and the number of electronic devices may be set as needed in practical applications.

In some examples, the first electronic device may be an electronic device used by a live streamer user, and the second electronic device may be an electronic device used by an audience user.

In some examples, the first electronic device may be configured with a photographing apparatus or connected with the photographing apparatus, so as to perform live video streaming by the photographing apparatus.

Exemplarily, the electronic device 102 may be any electronic product capable of performing human-computer interaction with a user in one or more manners such as a keyboard, a touchpad, a touch screen, a remote controller, a voice interaction or handwriting device, and the electronic product may be, for example, a mobile phone, a tablet computer, a palmtop computer, a personal computer (PC), a wearable device, a smart television, etc.

Exemplarily, the server 101 is mainly configured to implement the page display method provided in the embodiment of the present application, and further, the server 101 is configured to manage live video streaming, for example, manage live streaming interaction data between the live streamer user and the audience user, and the like. In some embodiments, the server 101 may be one server, a server cluster composed of a plurality of servers, or one cloud computing service center.

It should be noted that the page display method provided in the embodiment of the present application may be executed by the electronic device 102. Exemplarily, when the page display method provided in the embodiment of the present application is executed by the electronic device 102, the process is: the electronic device 102 loads an object presentation module in response to a trigger operation for a target control in a live streaming page; when it is determined that the object presentation module is successfully loaded, displays the object presentation module, and loads an object aggregation module; and when it is determined that the object aggregation module is successfully loaded and a first operation for a display page of the object presentation module is detected, fuses the object presentation module and the object aggregation module to obtain a fused module, and displays the fused module. Therefore, the problem in which page skip is required for switching a display page of the object presentation module to a display page of the fused module is avoided, the interaction cost of the user is saved, and the user experience is improved.

Those skilled in the art should understand that the electronic device and the server are merely examples, other existing or electronic devices or servers that may appear in the future should also be included in the protection scope of the present application if they are applicable to the present application, and are included herein by reference.

An execution body of the page display method provided in the embodiment of the present application may be a page display apparatus, or may be a functional module and/or a functional entity capable of implementing the page display method in the page display apparatus, which may be specifically determined according to actual use requirements and is not limited in the embodiment of the present application.

Figure 2:
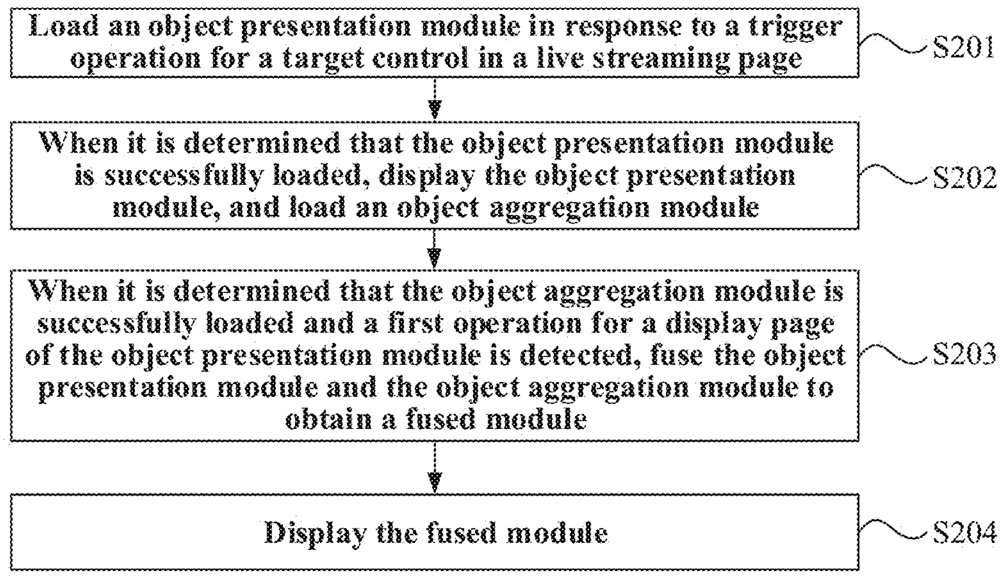
FIG. 2 is a first flowchart illustrating steps of a page display method provided in an embodiment of the present application.

An embodiment of the present application provides a page display method, wherein an execution body of the page display method may be the above electronic device or page display apparatus, or the like. Referring to FIG. 2, the page display method includes the following steps:

S201: loading an object presentation module in response to a trigger operation for a target control in a live streaming page.

Firstly, a live streaming room refers to a virtual space constructed by using software and hardware resources in a live streamer device, an audience device and a live streaming platform device during live video streaming. The live streamer user may create or log in the live streaming room by the live streamer device, and publish live streaming content to the live streaming room. The audience user may view, by the audience device that has logged in the live streaming room, the live streaming content published by the live streamer user. Generally, information such as live streaming content and interactive messages, which are published in the live streaming room, may be displayed on all terminal devices that have logged in the live streaming room. The live streaming page refers to a page displayed on the live streamer device or the audience device during live video streaming.

Figure 3:
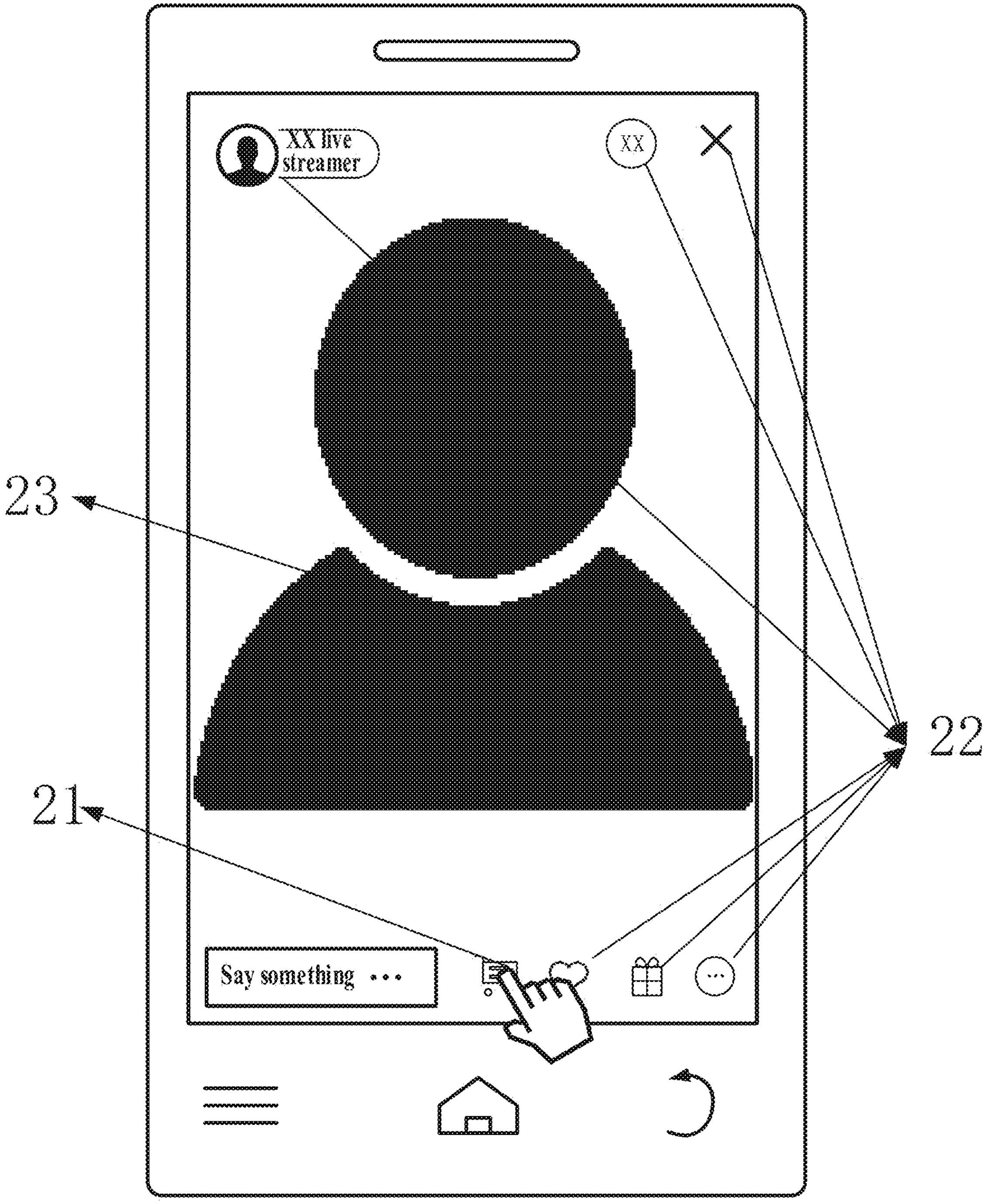
FIG. 3 is a first schematic diagram of a resource display interface provided in an embodiment of the present application.

The live streaming page may include various media resources, for example, controls, persons, interactive messages, commodities, and the like. For example, FIG. 3 is a schematic diagram of a live streaming page provided in an embodiment of the present application, including a target control 21, at least one other control 22, and a person 23 (a live streamer), wherein the target control 21 may be a shopping cart control or a small-yellow-cart control; and the other control 22 may include a like control, a gift control, a more control, a fan control, an exit control, a live streamer account entry control, etc.

Then, the object presentation module is loaded in response to the trigger operation for the target control in the live streaming page. Exemplarily, in the live streaming page shown in FIG. 3, the trigger operation for the target control may be a click operation. In this way, upon detecting the click operation of the user for the target control in the live streaming page, the object presentation module is loaded.

The object presentation module at least includes object information. The object information presented in the object presentation module may be object information corresponding to a certain type of media resource object in the media resources of the live streaming page. For example, when the current live streaming page is a commodity vending page (i.e., the current live streaming is commodity live streaming), the media resource object may be a commodity, the object information corresponding to the media resource object may be commodity information, and the commodity information may include information such as a commodity name, a commodity price, and a commodity picture, etc.

In some embodiments, the object presentation module may further include at least one control, configured to provide a page skip entry for the user. For example, when the object information is commodity information, the at least one control may include a buy control, a purchase control, etc.

Finally, the object presentation module may be loaded by a corresponding page calling method.

Exemplarily, when an operating system of the page display apparatus is an Android operating system, the object presentation module may be loaded by a page getLivePromotionListRootView ( ): View in a page class ILivePromotionListFragmentHandler. The View is used for indicating that one View object is returned by the method, that is, the returned object presentation module is presented in the form of a view.

S202: when it is determined that the object presentation module is successfully loaded, displaying the object presentation module, and loading an object aggregation module.

Firstly, it is determined that the object presentation module is successfully loaded. Specifically, whether the object presentation module is successfully loaded may be determined by monitoring a loading event, or whether the object presentation module is successfully loaded may also be determined in a page callback manner. For example, a callback method is set in a corresponding page, and when the object presentation module is successfully loaded, the callback method is called to return a loading success indication. The manner of determining the successful loading of the object presentation module is not limited in the present application.

Then, the object presentation module is displayed.

In some embodiments, the object presentation module may be displayed at a first ratio.

The first ratio is a ratio of a display view of the object presentation module to a display interface of a screen. The value of the first ratio is preset, and the value of the first ratio is less than or equal to 1. For example, the value of the first ratio may be 0.7, and at this time, the ratio of the display view of the object presentation module to the display interface of the screen is 7:10, which is also referred to as seven-split screen display.

Figure 4:
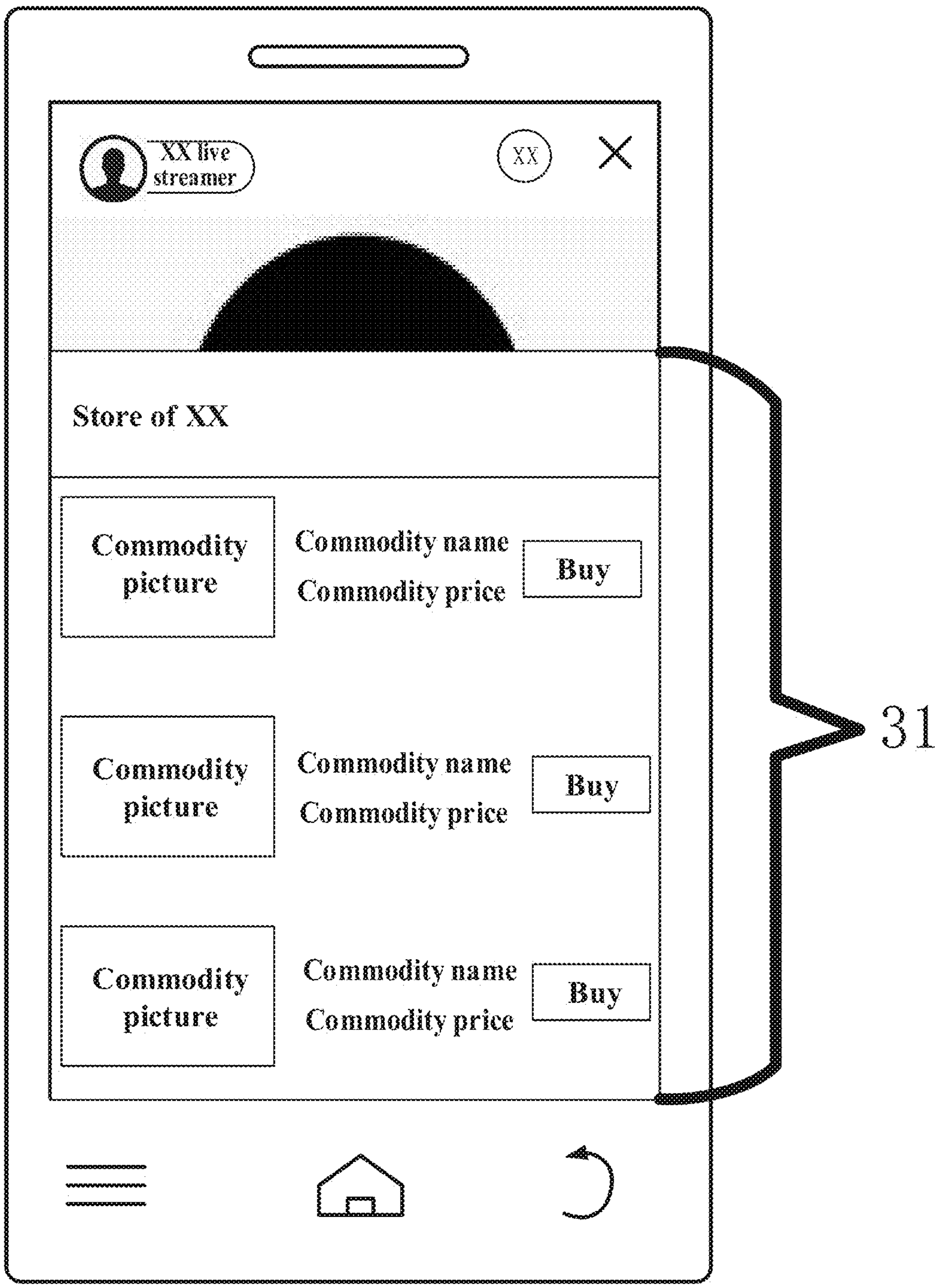
FIG. 4 is a second schematic diagram of a resource display interface provided in an embodiment of the present application.

Exemplarily, it is taken as an example that the current live streaming is commodity vending live streaming, FIG. 4 is a display view of the object presentation module on the live streaming page, including an object presentation module view 31 (located on a top layer) and a live streaming page (located on the next layer of the object presentation module view 31). The object presentation module view 31 includes object information, that is, commodity information and at least one control, wherein the at least one control includes a buy control corresponding to each commodity; and the commodity information includes a commodity picture, a commodity name and a commodity price. The ratio of the object presentation module view 31 to the display interface of the screen is 0.7, that is, the value of the first ratio 0.7.

Finally, the object aggregation module is loaded.

The object aggregation module at least includes an object aggregation identifier.

In some embodiments, the object aggregation module may further include at least one aggregation object. The aggregation object aggregated in the object aggregation module may include a media resource object presented in the object presentation module, or may include other objects of the same type as the media resource object. For example, when the current live streaming is commodity vending live streaming, the aggregation object may include commodities sold in the current live streaming, or may include commodities that are not sold in the current live streaming, the object aggregation identifier may be a store identifier, and the aggregation object may be a commodity sold in a store.

Figure 5:
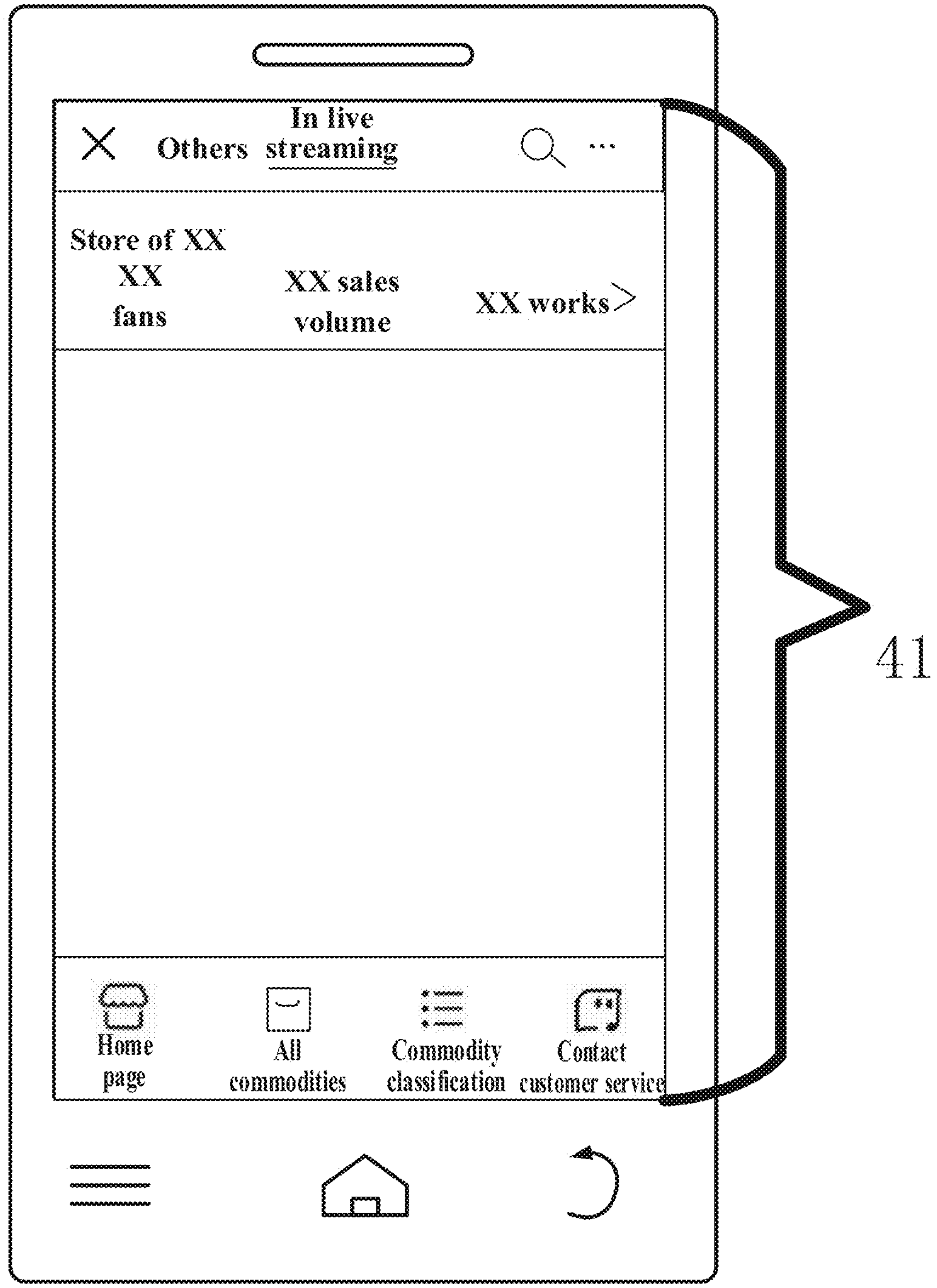
FIG. 5 is a third schematic diagram of a resource display interface provided in an embodiment of the present application.

In some embodiments, the object aggregation module may further include at least one control and at least one tab, which are configured to provide a page skip entry for the user. For example, when the current live streaming is commodity vending live streaming, FIG. 5 is a display view of the object aggregation module, including an object aggregation module view 41, wherein the aggregation module view 41 includes an object aggregation identifier, at least one control, and at least one tab; the object aggregation identifier is a store of XX; the at least one control includes a home page control, an all-commodities control, a commodity classification control, a contact customer service control, XX work control, a search control and a more control; the at least one tab includes others and in live streaming; and the user may switch the display page by clicking on the tabs or the controls.

The manner of loading the object aggregation module is the same as the manner of loading the object presentation module in the step S201, thus details are not described herein again.

S203: when it is determined that the object aggregation module is successfully loaded and a first operation for a display page of the object presentation module is detected, fusing the object presentation module and the object aggregation module to obtain a fused module.

Firstly, the manner of determining the successful loading of the object aggregation module is the same as the manner of determining the successful loading of the object presentation module in the step S201, thus details are not described herein again.

Then, the first operation for the display page of the object presentation module is detected.

The first operation is triggered by the user in a first target area of the display page of the object presentation module, the first target area is an area where the display view of the object presentation module is located, and the first operation may be a gesture operation. For example, the first operation is an upward-sliding gesture operation.

At this time, both the object presentation module and the object aggregation module have been successfully loaded, the object presentation module has been displayed, and the object aggregation module is not displayed.

Since different operating systems have different module loading manners, the manners of correspondingly detecting the first operation for the display page of the object presentation module are also different.

For example, when the operating system is an Android operating system, every time a module is loaded, a view corresponding of the module is directly loaded into a corresponding position on the display interface of screen according to configuration parameters during loading. For example, after the object presentation module is successfully loaded, the object presentation module view has been loaded into the first target area, then the object aggregation module is loaded, at this time, if the position of the object aggregation module view covers the first target area in the loading configuration parameters of the object aggregation module, the object aggregation module view will cover the object presentation module view and is displayed as needed. The object presentation module view is the display view of the object presentation module, and the object aggregation module view is the display view of the object aggregation module.

As another example, when the operating system is an IOS operating system, every time a module is loaded, the module is only loaded to the background and is not loaded to a corresponding position, and the view of the module is displayed at the corresponding position until when the module needs to be displayed. For example, after the object presentation module is successfully loaded, the object presentation module is only successfully loaded to the background, and the view of the object presentation module is displayed in the first target area until when the object presentation module needs to be displayed.

Therefore, when the current operating system is a first-type operating system, the manner of detecting the first operation for the display page of the object presentation module may be: detecting, by the object aggregation module, the first operation for the display page of the object presentation module.

The first-type operating system is an operating system having the same module loading manner as the Android operating system loading module, and of course, the first-type operating system may also be an Android operating system.

In some embodiments, the manner of detecting the first operation for the display page of the object presentation module by the object aggregation module may be: after detecting the first operation for a first target area, the object aggregation module distributes the first operation to the object presentation module, so that the object presentation module responds to the first operation.

Firstly, the object aggregation module detects the first operation for the first target area.

For example, when the first operation is an upward-sliding gesture operation, the manner of the detecting the first operation for the first target area by the object aggregation module may be: obtaining a sliding degree of the first operation by a page onOffsetChanged(factor:Float,totalHeight:Int), and when the sliding degree is greater than a sliding threshold value, determining that the first operation for the first target area is detected, wherein the value range of factor is 0 to 1, 0 denotes an initial position, 1 denotes completely sliding, totalHeight denotes an actual distance of sliding from the initial state to an end point, the sliding threshold value is preset, for example, the sliding threshold value is a default value, or a value sent by related personnel according to actual situations.

Then, the first operation is distributed to the object presentation module, so that the object presentation module responds to the first operation.

Since the first operation for the first target area is detected by the object aggregation module, the coordinates of the first operation detected by the object aggregation module are coordinates corresponding to the object aggregation module. Therefore, when distributing the first operation to the object presentation module, a coordinate point of the first operation in the object aggregation module view also needs to be converted into a coordinate point of the first operation in the first target area, and then the first operation is distributed to the object presentation module to avoid errors. Alternatively, when the first operation is distributed to the object presentation module, a position offset of the first operation is carried, so that the object presentation module determines the position of the first operation according to the offset in the first operation, and then responds to the first operation. For example, the position offset of the first operation may be transferred by a page onOffsetChanged(factor:Float,totalHeight:Int,roomId:Long), wherein factor is used for representing an offset factor, totalheight is used for representing a total height, and roomId is used for representing an identification (ID) of the current live streaming room.

When the current operating system is a second-type operating system, the manner of detecting the first operation for the display page of the object presentation module may be: detecting, by a preset proxy, the first operation for the display page of the object presentation module.

The second-type operating system is an operating system having the same module loading manner as the IOS operating system loading module, and of course, the second-type operating system may also be an IOS operating system.

In some embodiments, the manner of detecting the first operation for the display page of the object presentation module by the preset proxy may be: after detecting the first operation for the first target area, the preset proxy distributes the first operation to the object presentation module, so that the object presentation module responds to the first operation.

Before detecting the first operation for the display page of the object presentation module by the preset proxy, the page display method further includes: configuring the preset proxy.

Then, the object presentation module and the object aggregation module are fused to obtain the fused module.

The fused module at least includes the object information and the object aggregation identifier.

In some embodiments, when the current operating system is the first-type operating system, the manner of fusing the object presentation module and the object aggregation module to obtain the fused module may be: calling a fusion method by a fusion page, using the object aggregation module as a parent layout, and using the object presentation module as a child layout of the parent layout to obtain the fused module, wherein the first-type operating system is an operating system having the same module loading manner as the Android operating system loading module, and of course, the first-type operating system may also be an Android operating system.

For example, when the first-type operating system is an Android operating system, the fusion page may be getLivePromotionListTransferableView(needRemoveFromParent: Boolean):Pair<View,View>, wherein a getLivePromotionListTransferableView ( ): Pair<View,View> user uses the object aggregation module as the parent layout and uses the object presentation module is used as the child layout of the parent layout to obtain the fused module.

In some embodiments, when the current operating system is the second-type operating system, the manner of fusing the object presentation module and the object aggregation module to obtain the fused module may be: calling a fusion component by the fusion page, and fusing the object presentation module into the object aggregation module to obtain the fused module, wherein the second-type operating system is an operating system having the same module loading manner as the IOS operating system loading module, and of course, the second-type operating system may also be an IOS operating system.

For example, when the second-type operating system is an IOS operating system, the fusion page may be (IESECLiveFusionComponentRef)liveFusionComponentWithParams:(NSDictionary*)paramsm anager: (id<IESECLiveFusionManager>)manager. The fusion component may be a View component or a ViewController component.

In some embodiments, when the current operating system is the second-type operating system, the page display method further includes: obtaining a fusing progress of fusing the object presentation module into the object aggregation module, and when the fusing progress is greater than a fusion threshold value, determining that the fusion succeeds and obtaining the fused module.

The fusing progress may be acquired by a target page. For example, when the second-type operating system is an IOS operating system, the target page may be (void)fusionTransitionUpdate: (IESECLiveTransitionInfo*)info.

S204: displaying the fused module.

In some embodiments, the fused module may be displayed at a second ratio.

The second ratio is a ratio of a display view of the fused module to the display interface of the screen. The value of the second ratio is preset, and the value of the second ratio is less than or equal to 1. For example, the value of the second ratio may be 1, and at this time, the ratio of the display view of the fused module to the display interface of the screen is 1:1, which is also referred to as full-screen display.

Figure 6:
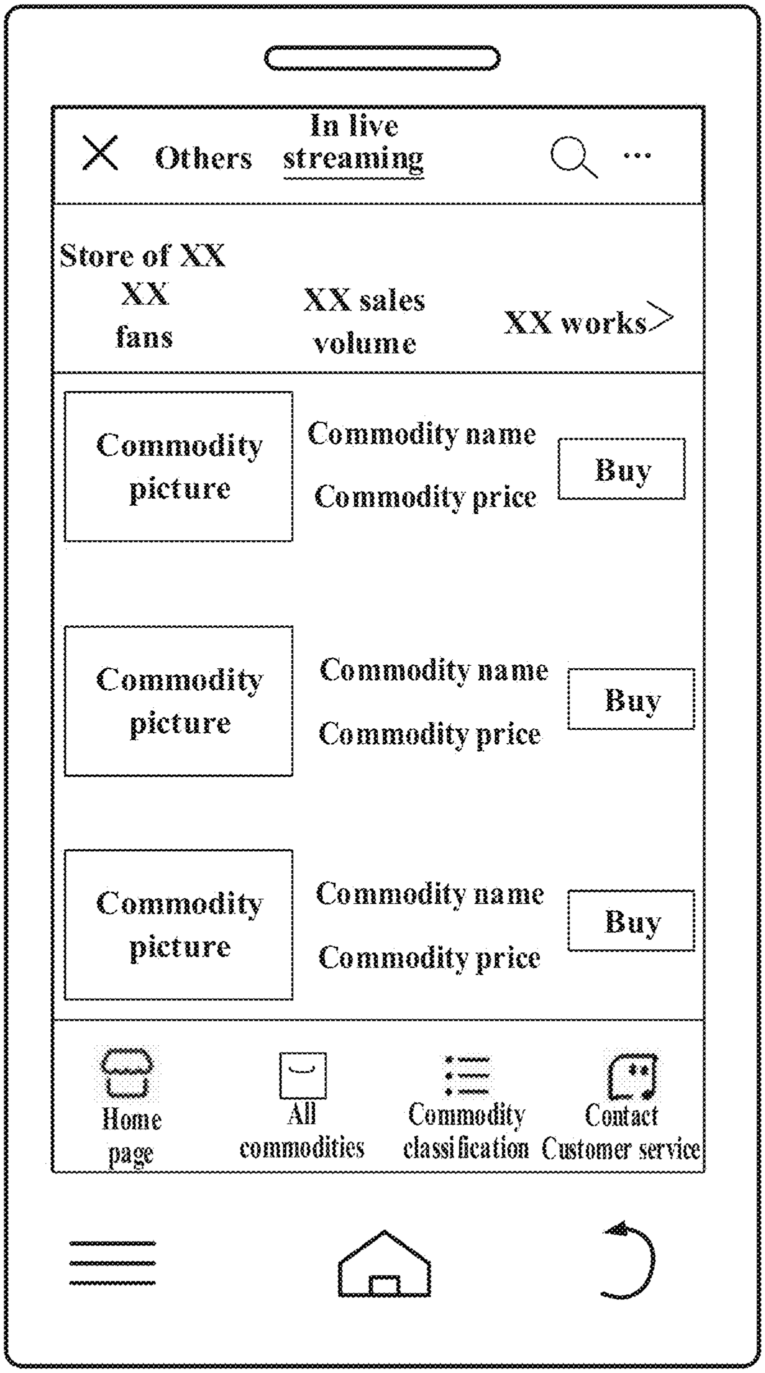
FIG. 6 is a fourth schematic diagram of a resource display interface provided in an embodiment of the present application.

Exemplarily, when the current live streaming is commodity vending live streaming, FIG. 6 is a display view of the fused module on the live streaming page, including all media resource objects in the object presentation module view and the object aggregation module view. The ratio of a fused resource view to the display interface of the screen is 1, that is, the value of the second ratio is 1.

In the above solution, the object presentation module is loaded in response to the trigger operation for the target control in the live streaming page. Then, when it is determined that the object presentation module is successfully loaded, the object presentation module is displayed, and the object aggregation module is loaded. Afterwards, when it is determined that the object aggregation module is successfully loaded and the first operation for the display page of the object presentation module is detected, the object presentation module and the object aggregation module are fused to obtain the fused module, and the fused module is displayed. In this way, firstly, when it is determined that the object presentation module is successfully loaded, the object aggregation module is directly loaded, thereby avoiding loading only when the user requires, saving the time of the user and improving the user experience. Secondly, when the user performs the first operation, the object presentation module and the object aggregation module are directly fused and displayed, page skip is not needed any more, thereby saving on the interaction cost of the user and further improving the user experience. In addition, the object presentation module and the object aggregation module are separately loaded and fused when necessary, so that when the content of the object presentation module or the content of the object aggregation module is modified and deleted, the other module is not affected, thereby reducing mutual interference during interservice iteration.

Figure 7:
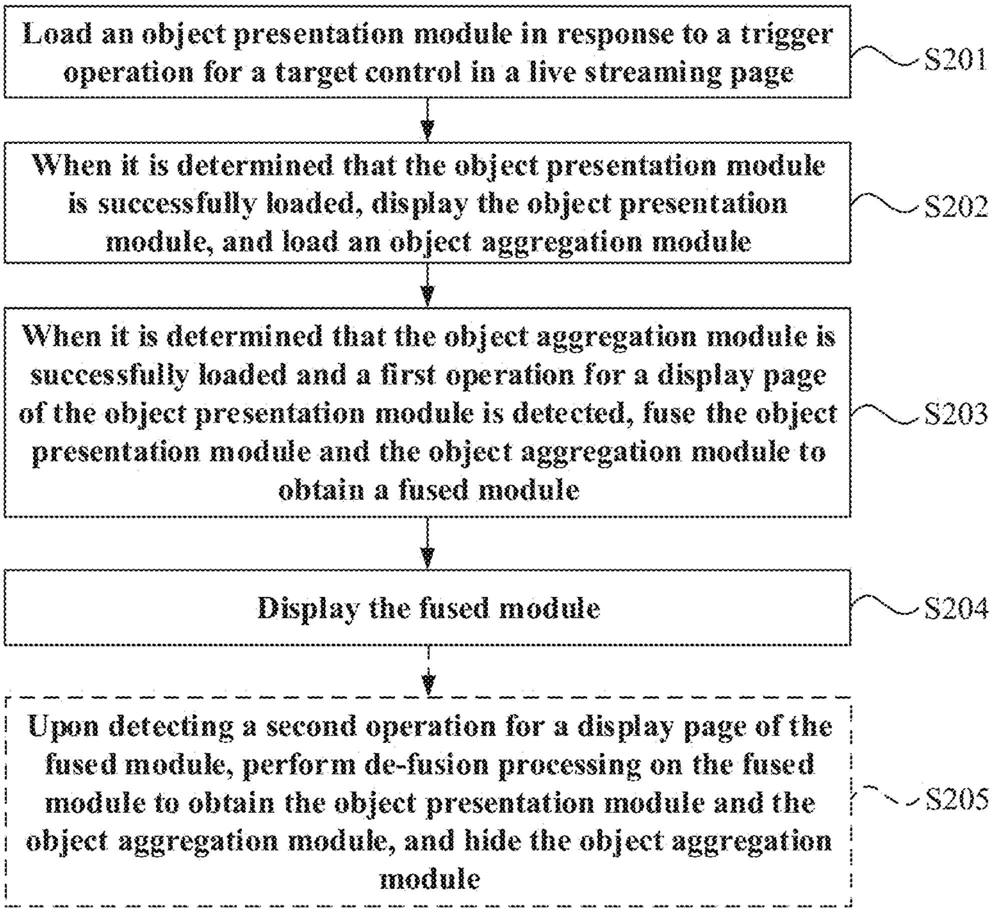
FIG. 7 is a second flowchart illustrating steps of an interface display method provided in an embodiment of the present application.

In some embodiments, as shown in FIG. 7, after the step S204, the page display method further includes a step S205.

S205: upon detecting a second operation for a display page of the fused module, performing de-fusion processing on the fused module to obtain the object presentation module and the object aggregation module, and hiding the object aggregation module.

Firstly, the second operation for the display page of the fused module is detected.

The second operation is triggered by the user in a second target area of the display page of the fused module, and the second target area is an area where the display view of the fused module is located. The second operation may be a trigger operation for an exit control, and the second operation may also be a gesture operation. For example, the second operation is a downward-sliding gesture operation.

In this way, the manner of detecting the second operation for the display page of the fused module may be: directly detecting the second operation for the second target area by the fused module.

Then, the de-fusion processing is performed on the fused module to obtain the object presentation module and the object aggregation module fused module.

In some embodiments, when the current operating system is the first-type operating system, the manner of performing de-fusion processing on the fused module to obtain the object presentation module and the object aggregation module may be: calling a de-fusion approach by a de-fusion page, and separating the object presentation module as the child layout from the object aggregation module as the parent layout, so as to obtain the object presentation module and the object aggregation module.

The first-type operating system is an operating system having the same module loading manner as the Android operating system loading module, and of course, the first-type operating system may also be an Android operating system. For example, when the first-type operating system is an Android operating system, the de-fusion page may be getLivePromotionListTransferableView(needRemoveFromParent:Boolean):Pair<View,View>, wherein needRemoveFromParent:Boolean is used for determining whether it is necessary to separate the object presentation module as the child layout from the object aggregation module as the parent layout, so as to obtain the object presentation module and the object aggregation module.

In some embodiments, when the current operating system is the second-type operating system, the manner of performing de-fusion processing on the fused module to obtain the object presentation module and the object aggregation module may be: calling a de-fusion component by the de-fusion page, and performing de-fusion processing on the fused module to obtain the object presentation module and the object aggregation module.

The second-type operating system is an operating system having the same module loading manner as the IOS operating system loading module, and of course, the second-type operating system may also be an IOS operating system. For example, when the second-type operating system is an IOS operating system, the de-fusion page may be (IESECLiveFusionComponentRef)liveFusionComponentWithParams:(NSDictionary*)paramsm anager:(id<IESECLiveFusionManager>) manager. The de-fusion component may be a View component or a ViewController component.

In some embodiments, when the current operating system is the second-type operating system, the page display method further includes: obtaining a de-fusing progress of performing de-fusion processing on the fused module, and when the de-fusing progress is greater than a de-fusion threshold value, determining that the de-fusion succeeds and obtaining the object presentation module and the object aggregation module. The de-fusing progress may be acquired by a target page. For example, when the second-type operating system is an IOS operating system, the target page may be (void)fusionTransitionUpdate: (IESECLiveTransitionInfo*)info.

Finally, the object aggregation module is hidden.

In some embodiments, when the second operation is a downward-sliding gesture operation, the manner of hiding the object aggregation module may be: performing transparency gradient processing on the hiding of the object aggregation module with the downward-sliding gesture operation, for example, the longer a gesture sliding position, the greater the transparency of the object aggregation module is, wherein a change relationship between the sliding length and the transparency of the gesture position is preset and may be set by related personnel according to actual situations.

In the above solution, upon detecting the second operation for the display page of the fused module, the de-fusion processing is performed on the fused module to obtain the object presentation module and the object aggregation module, and the object aggregation module is hidden. No page skip is required for returning the object presentation module view, thereby saving the interaction cost of the user and further improving the user experience.

In some embodiments, after the step S204, the page display method further includes:

upon detecting a third operation for the second target area, hiding a part of media resource objects in the fused module, which are close to a top end of the display interface of the screen, and overlapping the top of the remaining fused module view with a preset area in the display interface of the screen, wherein the third operation may be a gesture operation, for example, the third operation is an upward-sliding gesture operation.

Figure 8:
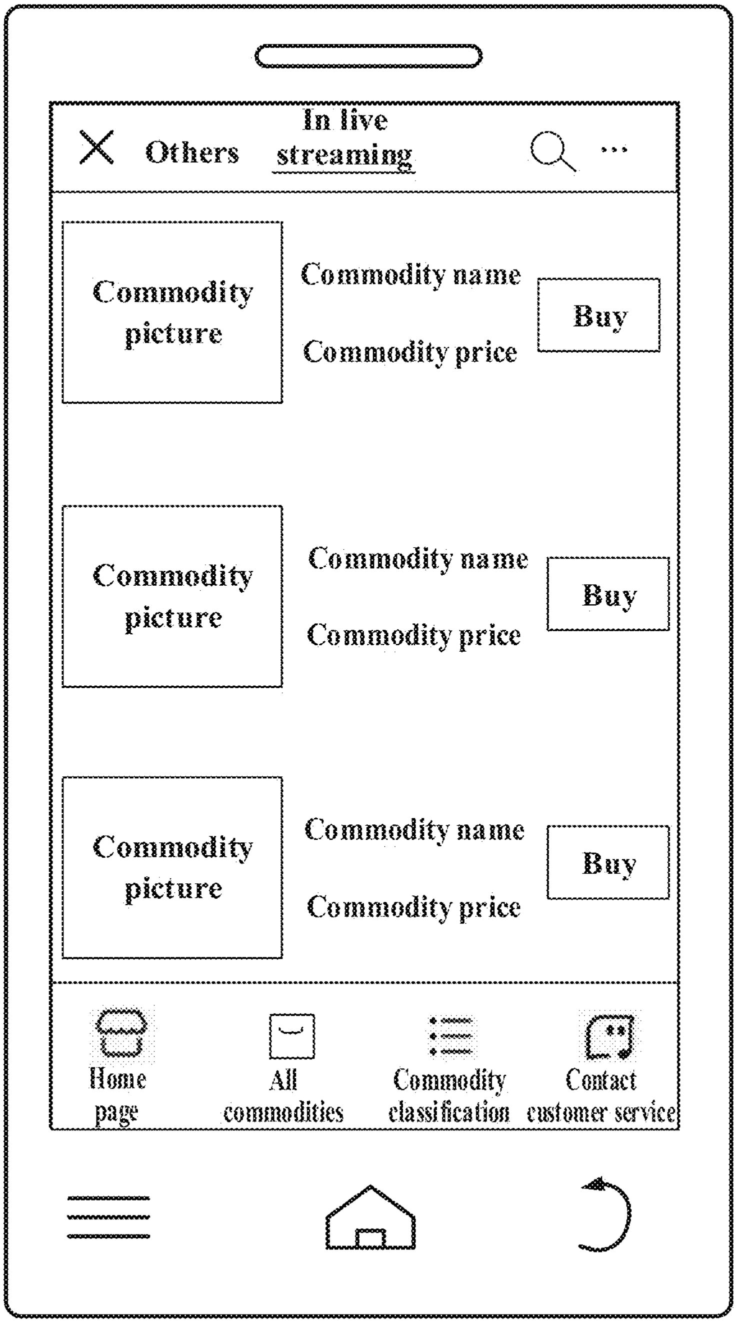
FIG. 8 is a fifth schematic diagram of a resource display interface provided in an embodiment of the present application.

Exemplarily, when the current live streaming is commodity vending live streaming, FIG. 8 is another display view of the fused module on the live streaming page, including: commodity information, at least one control, and at least one tab. The commodity information includes a commodity picture, a commodity name and a commodity price; the at least one control includes a buy control corresponding to each commodity, a home page control, an all-commodities control, a commodity classification control, a contact customer service control, a search control and a more control; the at least one tab includes others and in live streaming; and the user may switch the display page by clicking on the tabs or the controls. With respect to the display view of the fused module on the live streaming page in FIG. 6, information such as store of XX, XX work control, XX fans, XX sales volumes and the like in the fused module are hidden.

In the above solution, in a state in which the fused module is displayed, if the third operation of the user in the second target area is detected, a part of media resource objects in the fused module, which are close to the top end of the display interface of the screen, are hidden to display more object information, thereby improving the flexibility of interaction with the user.

Figure 9:
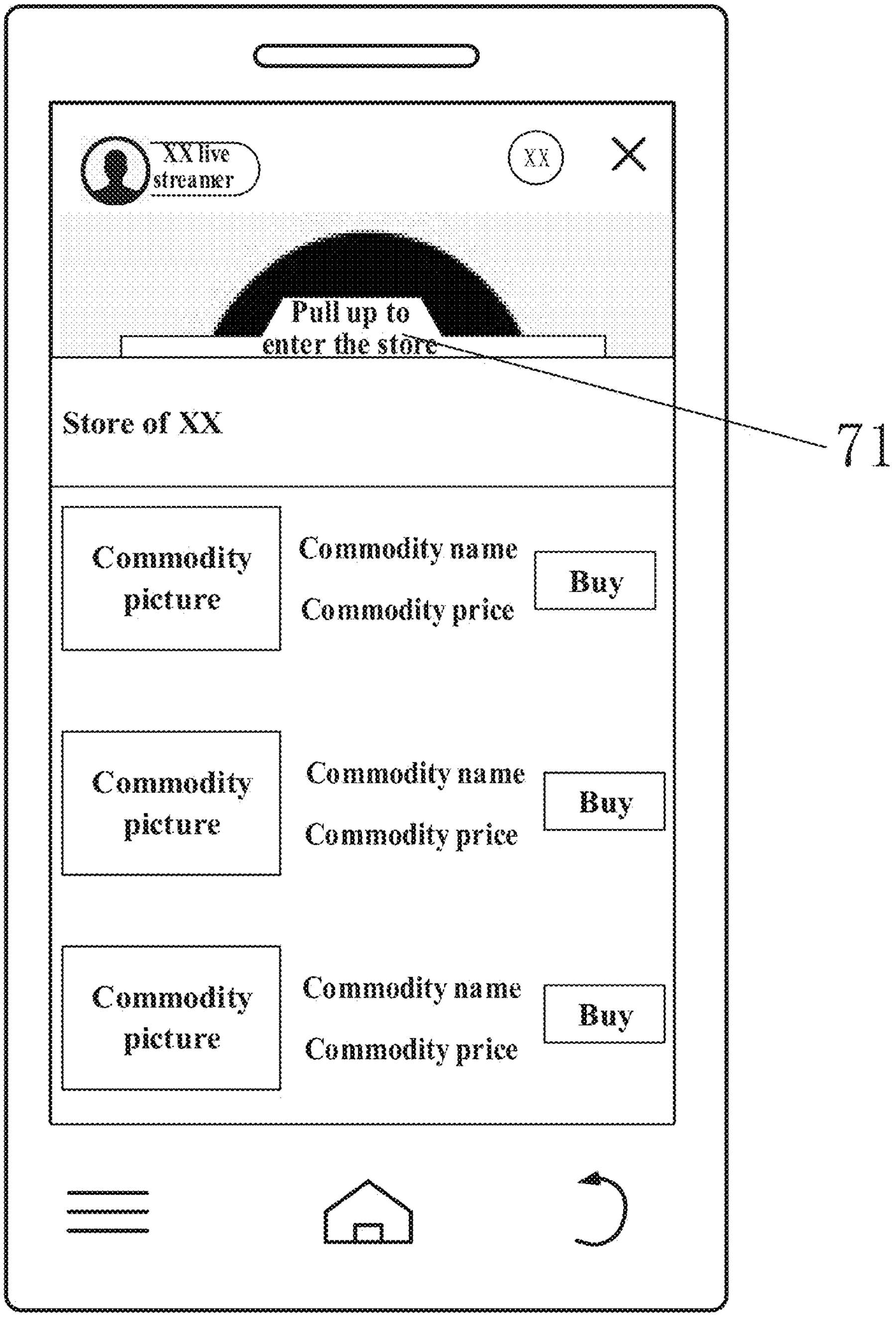
FIG. 9 is a sixth schematic diagram of a resource display interface provided in an embodiment of the present application.

In some embodiments, after determining that the object aggregation module is successfully loaded, the page display method further includes: displaying first prompt information, wherein the first prompt information is used for prompting to execute the first operation, so as to enter the display page of the fused module. Exemplarily, when the current live streaming is commodity vending live streaming, FIG. 9 is a page for displaying first prompt information 71 after it is determined that the object aggregation module is successfully loaded. The first prompt information is "pull up to enter the store". Certainly, the location and content of the first prompt information may be set according to actual situations, which is not limited in the present application.

In the above solution, the first prompt information is used for prompting the user to execute the first operation, so as to present the display page of the fused module, thereby avoiding the situation in which the user cannot perform the operation and thus cannot enter the display page of the fused module, thus improving the user experience.

Figure 10:
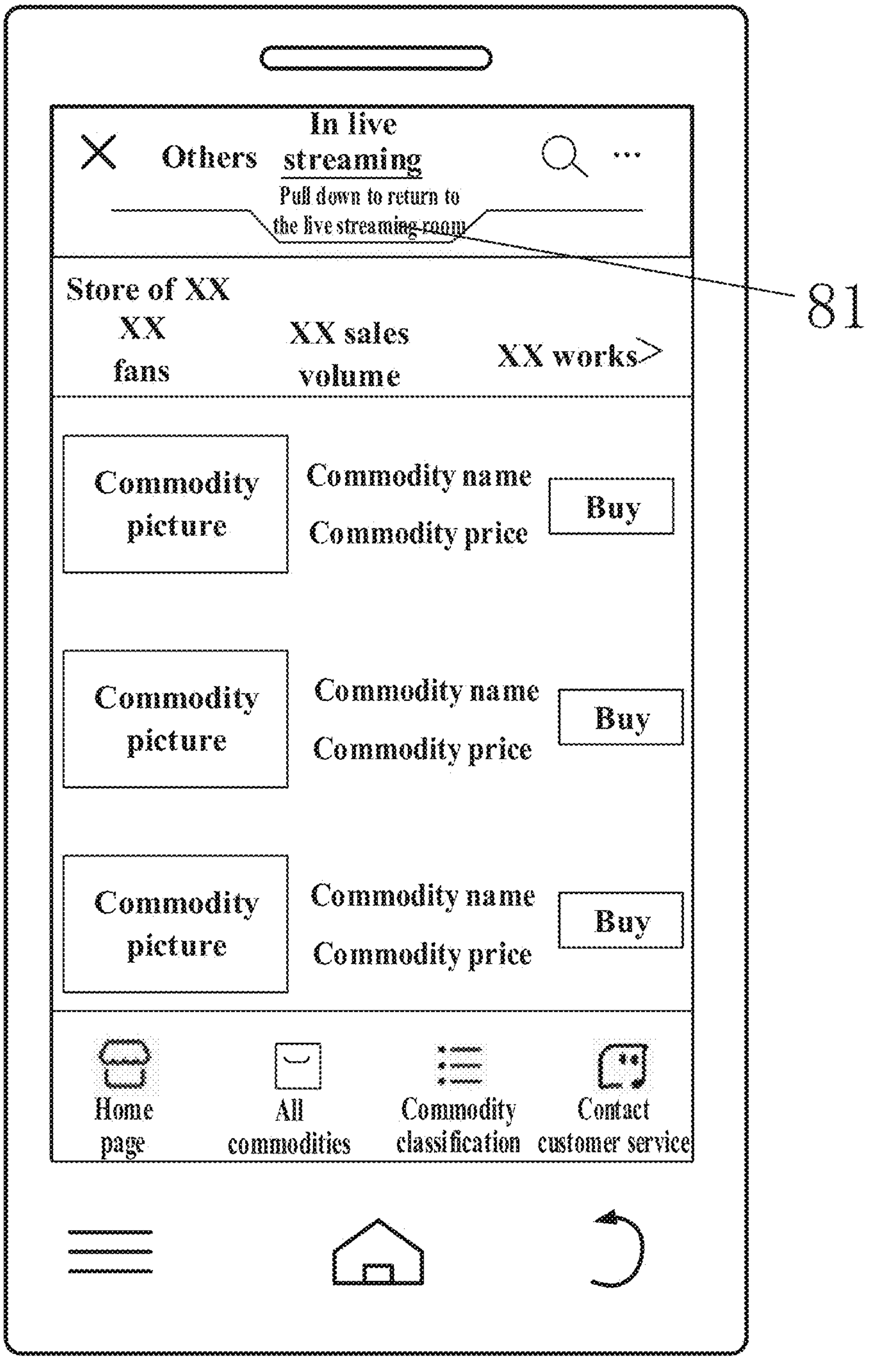
FIG. 10 is a seventh schematic diagram of a resource display interface provided in an embodiment of the present application.

In some embodiments, after the step S204, the page display method further includes: displaying second prompt information, wherein the second prompt information is used for prompting to execute the second operation, so as to hide the object aggregation module. Exemplarily, when the current live streaming is commodity vending live streaming, FIG. 10 is a page for displaying second prompt information 81 after the fused module is displayed. The second prompt information is "pull down to return to the live streaming room". Similarly, the position and content of the second prompt information may be set according to actual conditions, which is not limited in the present application.

In the above solution, the second prompt information is used for prompting the user to execute the second operation, so as to exit the display page of the fused module, thereby avoiding the situation in which the user cannot perform the operation and thus cannot exit the display page of the fused module, thus further improving the user experience.

In some embodiments, a consumer corresponding to an operation event (including the first operation and the second operation) includes the object presentation module and the object aggregation module.

When both the object presentation module and the object aggregation module are successfully loaded, but are not fused, when a touch area of the operation event is in the first target area, the consumption priorities of the operation event sequentially include: seven-split screen and full-screen switching, nested sliding of the object presentation module view and the object aggregation module view, and internal sliding of the object presentation module view.

In the case of the fused module, when the touch area of the operation event is in the second target area and is not in the first target area, the consumption priorities of the operation event sequentially include: nested sliding of the object presentation module view and an area other than the first target area in the second target area, and internal sliding of the object presentation module view. When the touch area of the operation event is in the second target area and in the first target area, the consumption priorities of the operation event sequentially include: internal sliding of the object presentation module view, nested sliding of the object presentation module view and the area other than the first target area in the second target area, and seven-split screen and full-screen switching.

In the above solution, different priorities are set for the consumer of the operation event according to the touch area of the operation event, thereby avoiding the problem in which the user performs the operation event in the touch area but a response is made in a non-touch area, improving the flexibility of consuming the operation event by the page display apparatus, and further improving the user experience.

Based on the same inventive concept, as an implementation of the above method, an embodiment of the present application further provides a page display apparatus, the embodiment corresponds to the foregoing method embodiments, therefore for ease of reading, details in the foregoing method embodiments are not repeated one by one in the present embodiment, but it should be clear that the page display apparatus in the present embodiment may correspondingly implement all content in the foregoing method embodiments.

Figure 11:
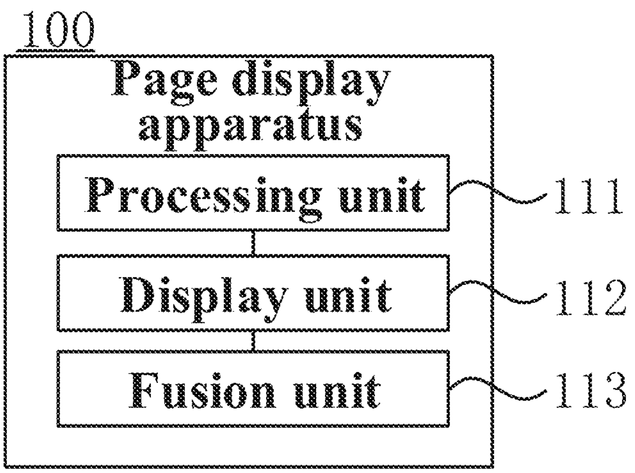
FIG. 11 is a schematic structural diagram of a page display apparatus provided in an embodiment of the present application.

An embodiment of the present application provides a page display apparatus, FIG. 11 is a schematic structural diagram of the page display apparatus, and as shown in FIG. 11, the page display apparatus 100 includes:

a processing unit 111, configured to load an object presentation module in response to a trigger operation for a target control in a live streaming page, wherein the object presentation module at least includes object information; a display unit 112, configured to: when it is determined that the object presentation module is successfully loaded, display the object presentation module, and load an object aggregation module, wherein the object aggregation module at least includes an object aggregation identifier; and a fusion unit 113, configured to: when it is determined that the object aggregation module is successfully loaded and a first operation for a display page of the object presentation module is detected, fuse the object presentation module and the object aggregation module to obtain a fused module, wherein the fused module at least includes the object information and the object aggregation identifier, wherein the display unit 112 is further configured to display the fused module.

As an optional implementation of the embodiment of the present application, the fusion unit 113 is specifically configured to: when a current operating system is a first-type operating system, call a fusion method by a fusion page, use the object aggregation module as a parent layout, and use the object presentation module as a child layout of the parent layout to obtain the fused module; or, when the current operating system is a second-type operating system, call a fusion component by the fusion page, and fuse the object presentation module into the object aggregation module to obtain the fused module.

As an optional implementation of the embodiment of the present application, the fusion unit 113 is further configured to: upon detecting a second operation for a display page of the fused module, perform de-fusion processing on the fused module to obtain the object presentation module and the object aggregation module, and hide the object aggregation module.

As an optional implementation of the embodiment of the present application, the fusion unit 113 is specifically configured to: when the current operating system is the first-type operating system, call a de-fusion approach by a de-fusion page, and separate the object presentation module as the child layout from the object aggregation module as the parent layout, so as to obtain the object presentation module and the object aggregation module; or when the current operating system is the second-type operating system, call a de-fusion component by the de-fusion page, and perform de-fusion processing on the fused module to obtain the object presentation module and the object aggregation module.

As an optional implementation of the embodiment of the present application, when the current operating system is the second-type operating system, the fusion unit 113 is further configured to: acquire a fusing progress of fusing the object presentation module into the object aggregation module, and when the fusing progress is greater than a fusion threshold value, determine that the fusion succeeds and obtain the fused module; and acquire a de-fusing progress of performing de-fusion processing on the fused module, and when the de-fusing progress is greater than a de-fusion threshold value, determine that the de-fusion succeeds and obtain the object presentation module and an object aggregation module.

As an optional implementation of the embodiment of the present application, the fusion unit 113 is specifically configured to: when the current operating system is the first-type operating system, detect, by the object aggregation module, the first operation for the display page of the object presentation module; or, when the current operating system is the second-type operating system, detect, by a preset proxy, the first operation for the display page of the object presentation module.

As an optional implementation of the embodiment of the present application, the display unit 112 is specifically configured to display the object presentation module at a first ratio, wherein the first ratio is a ratio of a display view of the object presentation module to a display interface of a screen.

As an optional implementation of the embodiment of the present application, the display unit 112 is specifically configured to display the fused module at a second ratio, wherein the second ratio is a ratio of a display view of the fused module to the display interface of the screen.

The page display apparatus provided in the present embodiment may execute the page display method provided in the foregoing method embodiments, and the implementation principles and technical effects thereof are similar, thus details are not described herein again.

Figure 12:
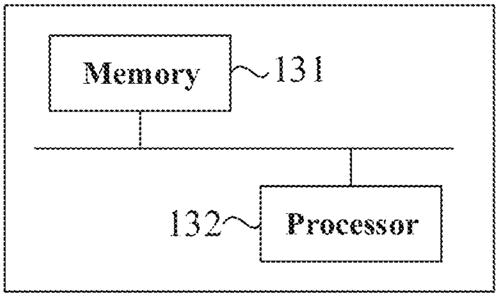
FIG. 12 is a schematic diagram of a hardware structure of an electronic device provided in an embodiment of the present application.

Based on the same inventive concept, an embodiment of the present application further provides an electronic device. FIG. 12 is a schematic structural diagram of an electronic device provided in an embodiment of the present application. As shown in FIG. 12, the electronic device provided in the present embodiment includes a memory 131 and a processor 132, wherein the memory 131 is configured to store a computer program; and the processor 132 is configured to, when executing the computer program, execute the page display method provided in the above embodiments.

Based on the same inventive concept, an embodiment of the present application further provides a computer-readable storage medium, storing a computer program thereon, wherein the computer program, when executed by a processor, causes a computing device to implement the page display method provided in the above embodiments.

Based on the same inventive concept, an embodiment of the present application further provides a computer program product that, when running on a computer, causes a computing device to implement the page display method provided in the above embodiments.

Those skilled in the art should understand that, the embodiments of the present application may be provided as a method, a system or a computer program product. Accordingly, the present application may adopt the form of a complete hardware embodiment, a complete software embodiment, or an embodiment combining software with hardware. Moreover, the present application may adopt the form of a computer program product which is implemented on one or more computer-usable storage media containing computer-usable program codes.

The processor may be a central processing unit (CPU), or may be another general-purpose processor, a digital signal processor (DSP), an application specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor, or the like.

The memory may include a volatile memory, a random access memory (RAM), and/or a non-volatile memory in a computer-readable medium, for example, a read-only memory (ROM) or a flash RAM. The memory is an example of a computer-readable medium.

The computer-readable medium includes non-volatile and volatile storage media, and movable and unmovable storage media. The storage medium may store information by using any method or technology, and the information may be a computer-readable instruction, a data structure, a module or other data of a program. Examples of the computer storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disk (DVD) or other optical storages, magnetic cassettes, a magnetic disk storage or other magnetic storage devices, or any other non-transmission medium, which may be used for storing information accessible by a computing device. According to the definitions herein, the computer-readable medium does not include transitory media, such as modulated data signals and carriers.

Finally, it should be noted that the above embodiments are only used for illustrating the technical solutions of the present application, rather than limiting same; although the present application has been described in detail with reference to the foregoing embodiments, those ordinary skilled in the art should understand that modifications may still be made to the technical solutions recorded in the foregoing embodiments or some or all of the technical features may be equivalently replaced; and these modifications or replacements do not make the essence of the corresponding technical solutions depart from the scope of the technical solutions of the embodiments of the present application.

We claim:

1. A page display method, comprising:

loading, in response to a trigger operation for a target control in a live streaming page, a first display view of at least object information;

displaying, in response to determining that the first display view is successfully loaded, the first display view on a part of an upper-layer page of the live streaming page, and loading a second display view of at least an object aggregation identifier;

fusing, in response to determining that the second display view is successfully loaded and a first operation for the upper-layer page of the live streaming page is detected, the first display view and the second display view on the upper-layer page of the live streaming page to obtain a third display view of at least the object information and the object aggregation identifier; and displaying the third display view comprising the first display view of the object information on the upper-layer page of the live streaming page.

2. The page display method according to claim 1, wherein fusing the first display view and the second display view to obtain the third display view comprises:

using, in response to a current operating system being a first-type operating system, the second display view as a parent layout, and the first display view as a child layout of the parent layout by means of a fusion page calling a fusion method to obtain the third display view; or fusing, in response to the current operating system being a second-type operating system, the first display view into the second display view by means of the fusion page calling a fusion component to obtain the third display view.

3. The page display method according to claim 2, wherein after displaying the third display view, the method further comprises:

upon detecting a second operation for the upper-layer page of the live streaming page, performing de-fusion processing on the third display view to obtain the first display view and the second display view, and hiding the second display view.

4. The page display method according to claim 3, wherein performing de-fusion processing on the third display view to obtain the first display view and the second display view comprises:

separating, in response to the current operating system being the first-type operating system, the first display view as the child layout from the second display view as the parent layout by means of a de-fusion page calling a de-fusion approach, to obtain the first display view and the second display view; or performing, in response to the current operating system being the second-type operating system, de-fusion processing on the third display view by means of the de-fusion page calling a de-fusion component to obtain the first display view and the second display view.

5. The page display method according to claim 2, wherein in response to the current operating system being the second-type operating system, the method further comprises:

obtaining a fusing progress of fusing the first display view into the second display view; determining, in response to the fusing progress being greater than a fusion threshold value, that the fusion succeeds; and obtaining the third display view; and obtaining a de-fusing progress of performing de-fusion processing on the third display view; determining, in response to the de-fusing progress being greater than a de-fusion threshold value, that the de-fusion succeeds; and obtaining the first display view and the second display view.

6. The page display method according to claim 1, wherein detecting the first operation for the upper-layer page of the live streaming page comprises:

detecting, by the second display view and in response to the current operating system being the first-type operating system, the first operation for the upper-layer page of the live streaming page; or detecting, in response to the current operating system being the second-type operating system, the first operation for the upper-layer page of the live streaming page.

7. The page display method according to claim 1, wherein displaying the first display view comprises:

displaying the first display view at a first ratio, wherein the first ratio is a ratio of a display view of the first display view to a display interface of a screen.

8. The page display method according to claim 1, wherein displaying the third display view comprises:

displaying the third display view at a second ratio, wherein the second ratio is a ratio of a display view of the third display view to the display interface of the screen.

9. An electronic device, comprising a memory and a processor, wherein the memory is configured to store a computer program, and the processor is configured to, when executing the computer program, cause the electronic device to:

load, in response to a trigger operation for a target control in a live streaming page, a first display view of at least object information;

display, in response to determining that the first display view is successfully loaded, the first display view on a part of an upper-layer page of the live streaming page, and loading a second display view of at least an object aggregation identifier;

fuse, in response to determining that the second display view is successfully loaded and a first operation for the upper-layer page of the live streaming page is detected, the first display view and the second display view on the upper-layer page of the live streaming page to obtain a third display view of at least the object information and the object aggregation identifier; and display the third display view comprising the first display view of the object information on the upper-layer page of the live streaming page.

10. The electronic device according to claim 9, wherein the electronic device caused to fuse the first display view and the second display view to obtain the third display view is further caused to:

use, in response to a current operating system being a first-type operating system, the first display view as a parent layout, and the first display view as a child layout of the parent layout by means of a fusion page calling a fusion method to obtain the third display view; or fuse, in response to the current operating system being a second-type operating system, the first display view into the first display view by means of the fusion page calling a fusion component to obtain the third display view.

11. The electronic device according to claim 10, wherein after displaying the third display view, the electronic device is further caused to:

upon detecting a second operation for the upper-layer page of the live streaming page, perform de-fusion processing on the third display view to obtain the first display view and the second display view, and hiding the second display view.

12. The electronic device according to claim 11, wherein the electronic device caused to perform de-fusion processing on the third display view to obtain the first display view and the second display view is further caused to:

separate, in response to the current operating system being the first-type operating system, the first display view as the child layout from the second display view as the parent layout by means of a de-fusion page calling a de-fusion approach, to obtain the first display view and the second display view; or perform, in response to the current operating system being the second-type operating system, de-fusion processing on the third display view by means of the de-fusion page calling a de-fusion component to obtain the first display view and the second display view.

13. The electronic device according to claim 10, wherein in response to the current operating system being the second-type operating system, the electronic device is further caused to:

obtain a fusing progress of fusing the first display view into the second display view; determining, in response to the fusing progress being greater than a fusion threshold value, that the fusion succeeds; and obtaining the third display view; and obtain a de-fusing progress of performing de-fusion processing on the third display view; determining, in response to the de-fusing progress being greater than a de-fusion threshold value, that the de-fusion succeeds; and obtaining the first display view and the second display view.

14. The electronic device according to claim 1, wherein the electronic device caused to detect the first operation for the upper-layer page of the live streaming page is further caused to:

detect, by the second display view and in response to the current operating system being the first-type operating system, the first operation for the display page of the first display view-upper-layer page of the live streaming page; or detect, in response to the current operating system being the second-type operating system, the first operation for the upper-layer page of the live streaming page.

15. The electronic device according to claim 9, wherein the electronic device caused to display the first display view is further caused to:

display the first display view at a first ratio, wherein the first ratio is a ratio of a display view of the first display view to a display interface of a screen.

16. The electronic device according to claim 9, wherein the electronic device caused to display the third display view is further caused to:

display the third display view at a second ratio, wherein the second ratio is a ratio of a display view of the third display view to the display interface of the screen.

17. A non-transitory computer-readable storage medium, storing a computer program thereon, wherein when the computer program is executed by a computing device, the computing device is caused to:

load, in response to a trigger operation for a target control in a live streaming page, a first display view of at least object information;

display, in response to determining that the first display view is successfully loaded, the first display view on a part of an upper-layer page of the live streaming page, and loading a second display view of at least an object aggregation identifier;

fuse, in response to determining that the second display view is successfully loaded and a first operation for the upper-layer page of the live streaming page is detected, the first display view and the second display view on the upper-layer page of the live streaming page to obtain a third display view of at least the object information and the object aggregation identifier; and display the third display view comprising the first display view of the object information on the upper-layer page of the live streaming page.

18. The non-transitory computer-readable storage medium according to claim 17, wherein the computing device caused to fuse the first display view and the second display view to obtain the third display view is further caused to:

use, in response to a current operating system being a first-type operating system, the second display view as a parent layout, and the first display view as a child layout of the parent layout by means of a fusion page calling a fusion method to obtain the third display view; or fuse, in response to the current operating system being a second-type operating system, the first display view into the second display view by means of the fusion page calling a fusion component to obtain the third display view.

19. The non-transitory computer-readable storage medium according to claim 18, wherein after displaying the third display view, the computing device is further caused to:

upon detecting a second operation for the upper-layer page of the live streaming page, perform de-fusion processing on the third display view to obtain the first display view and the second display view, and hiding the second display view.

20. The non-transitory computer-readable storage medium according to claim 19, wherein the computing device caused to perform de-fusion processing on the third display view to obtain the first display view and the second display view is further caused to:

separate, in response to the current operating system being the first-type operating system, the first display view as the child layout from the second display view as the parent layout by means of a de-fusion page calling a de-fusion approach, to obtain the first display view and the second display view; or perform, in response to the current operating system being the second-type operating system, de-fusion processing on the third display view by means of the de-fusion page calling a de-fusion component to obtain the first display view and the second display view.

* * * * *